United States Patent
Drumm et al.

(10) Patent No.: US 10,996,795 B2
(45) Date of Patent: *May 4, 2021

(54) ANTI-GLARE AND ANTI-REFLECTIVE TACTILE EFFECT SURFACE FOR OPTICAL TOUCH DETECTION

(71) Applicant: Beechrock Limited, Castletown (IM)

(72) Inventors: Owen Drumm, Dublin (IE); Robert Copperwhite, Dublin (IE)

(73) Assignee: Beechrock Limited, Castletown (IM)

( * ) Notice: Subject to any disclaimer, the term of this patent is extended or adjusted under 35 U.S.C. 154(b) by 0 days.

This patent is subject to a terminal disclaimer.

(21) Appl. No.: 16/547,516

(22) Filed: Aug. 21, 2019

(65) Prior Publication Data
US 2019/0377436 A1 Dec. 12, 2019

Related U.S. Application Data

(63) Continuation-in-part of application No. 15/898,184, filed on Feb. 15, 2018, now Pat. No. 10,423,280, which is a continuation of application No. 14/970,482, filed on Dec. 15, 2015, now Pat. No. 9,921,685.

(60) Provisional application No. 62/720,585, filed on Aug. 21, 2018, provisional application No. 62/091,770, filed on Dec. 15, 2014.

(51) Int. Cl.
*G06F 3/042* (2006.01)

(52) U.S. Cl.
CPC .... *G06F 3/042* (2013.01); *G06F 2203/04109* (2013.01)

(58) Field of Classification Search
CPC .. G06F 3/0308; G06F 3/03545; G06F 3/0412; G06F 3/042; G06F 3/0421; G06F 2203/04109
See application file for complete search history.

(56) References Cited

U.S. PATENT DOCUMENTS

| | | | |
|---|---|---|---|
| 4,484,179 A | 11/1984 | Kasday | |
| 5,942,761 A * | 8/1999 | Tuli | G06K 7/10722 250/556 |
| 9,170,683 B2 * | 10/2015 | Drumm | G06F 3/0421 |
| 9,405,382 B2 * | 8/2016 | Drumm | G06F 3/0308 |

(Continued)

OTHER PUBLICATIONS

PCT International Search Report and Written Opinion, PCT Application No. PCT/IB2019/000937, dated Jan. 10, 2020, 11 pages.

*Primary Examiner* — Joe H Cheng
(74) *Attorney, Agent, or Firm* — Fenwick & West LLP

(57) ABSTRACT

An optical touch-sensitive device includes a touch-sensitive surface over which touch events are detectable. The device also includes surface features on the surface that reduce touch object friction relative to an absence of surface features. Emitter and detectors are arranged along a periphery of the touch-sensitive surface. The emitters can produce optical beams that travel across the touch-sensitive surface to the detectors. Touches on the touch-sensitive surface disturb the optical beams and the touch-sensitive device determines touch events based on the disturbed optical beams. The surface features may also be arranged to reduce glare by diffusing light. In some embodiments, an anti-reflective layer is on top of the touch-sensitive surface and the surface features.

20 Claims, 14 Drawing Sheets

(56) References Cited

U.S. PATENT DOCUMENTS

| | | | |
|---|---|---|---|
| 9,921,685 B2* | 3/2018 | Drumm | G06F 3/042 |
| 10,423,280 B2* | 9/2019 | Drumm | G06F 3/042 |
| 2006/0098004 A1* | 5/2006 | Cok | G06F 3/0412 |
| | | | 345/207 |
| 2008/0029691 A1* | 2/2008 | Han | G06F 3/04883 |
| | | | 250/224 |
| 2008/0062151 A1* | 3/2008 | Kent | G06F 3/0436 |
| | | | 345/177 |
| 2009/0033637 A1* | 2/2009 | Han | G06F 3/0421 |
| | | | 345/175 |
| 2010/0001962 A1 | 1/2010 | Doray et al. | |
| 2010/0302210 A1* | 12/2010 | Han | G06F 3/0412 |
| | | | 345/175 |
| 2011/0074674 A1* | 3/2011 | Walberg | G06F 3/0428 |
| | | | 345/158 |
| 2012/0169672 A1* | 7/2012 | Christiansson | G06F 3/0421 |
| | | | 345/175 |
| 2012/0212457 A1* | 8/2012 | Drumm | G06F 3/0421 |
| | | | 345/175 |
| 2012/0212458 A1* | 8/2012 | Drumm | G06F 3/042 |
| | | | 345/175 |
| 2012/0218229 A1* | 8/2012 | Drumm | G06F 3/0416 |
| | | | 345/175 |
| 2012/0256882 A1* | 10/2012 | Christiansson | G06F 3/0428 |
| | | | 345/175 |
| 2012/0268403 A1* | 10/2012 | Christiansson | G06F 3/0421 |
| | | | 345/173 |
| 2013/0021302 A1* | 1/2013 | Drumm | G06F 3/0421 |
| | | | 345/175 |
| 2013/0044073 A1* | 2/2013 | Christiansson | G06F 3/042 |
| | | | 345/173 |
| 2013/0194237 A1 | 8/2013 | Kyung et al. | |
| 2014/0028629 A1 | 1/2014 | Drumm et al. | |
| 2014/0098065 A1* | 4/2014 | Deichmann | G06F 3/0421 |
| | | | 345/175 |
| 2018/0173334 A1 | 6/2018 | Drumm | |

* cited by examiner

ANTI-GLARE AND ANTI-REFLECTIVE TACTILE EFFECT SURFACE FOR OPTICAL TOUCH DETECTION

CROSS-REFERENCE TO RELATED APPLICATIONS

This application claims the benefit of U.S. Provisional Application No. 62/720,585, filed on Aug. 21, 2018, and is a continuation-in-part of U.S. application Ser. No. 15/898,184 (now U.S. Pat. No. 10,423,280), filed on Feb. 15, 2018, which is a continuation of U.S. application Ser. No. 14/970,482 (now U.S. Pat. No. 9,921,685) filed Dec. 15, 2015, which claims the benefit of U.S. Provisional Application No. 62/091,770, filed Dec. 15, 2014, all of which are incorporated by reference.

BACKGROUND

1. Field of Art

This disclosure relates generally to optical touch detection systems and in particular to touch surfaces with tactile features.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

The user experience with touch-sensitive displays may be negatively impacted by various factors. One such factor is friction between the touch object (e.g., the user's finger) and the touch-sensitive surface. For example, oil from the user's finger may interact with the surface causing excessive friction, negatively impacting the tactile experience of the user. Another problem that may arise is that light from the user's environment may reflect from a touch-sensitive surface, distracting the user from what is being displayed. For example, the user may see a reflection of their own face appearing to be superimposed over a document they are working on, a video they are watching, or the like. Thus, there is a need for improved touch-sensitive surfaces that provide improved tactile experiences, reduce the impact of reflected light, or both.

SUMMARY

An optical touch-sensitive device has a surface that produces a tactile effect experienced by the user.

In one aspect, the optical touch-sensitive device includes a planar optical waveguide structure having a top surface that includes tactile surface features (i.e., surface features that can be felt by the user). The device also includes multiple emitters and detectors. The emitters and detectors are arranged along a periphery of the waveguide structure. The emitters produce optical beams that propagate through the waveguide structure via total internal reflection (TIR) to the detectors. Touches on the top surface of the waveguide structure disturb the optical beams, and the touch-sensitive device determines touch events based on the disturbances.

In another aspect, the waveguide structure includes a planar waveguide having a flat, featureless top surface, and a tactile coating on the top surface. The tactile coating can have a same or different index of refraction as the planar waveguide. The tactile coating can include a printed material, e.g., a printed graphical border, a pigmented region, or a blocking layer.

Other aspects include components, devices, systems, improvements, methods, processes, applications, computer readable mediums, and other technologies related to any of the above.

Some embodiments relate to an optical touch-sensitive device that includes a touch-sensitive surface, surface features on the touch-sensitive surface, and emitters and detectors. Touch events are detectable over the touch-sensitive surface. The surface features reduce touch object friction relative to an absence of surface features. The emitters can produce optical beams that travel across the touch-sensitive surface to the detectors. Touches on the touch-sensitive surface disturb the optical beams. The touch-sensitive device determines touch events based on the disturbed optical beams. The emitters and detectors may be arranged along a periphery of the touch-sensitive surface. In some embodiments, optical beams are coupled by couplers to and from the touch-sensitive surface such that the emitters and detectors are not arranged along the periphery (e.g., the emitters are below the touch sensitive surface).

In some embodiments, the touch-sensitive surface is a top surface of a planar optical waveguide. The optical beams travel across the touch sensitive surface via total internal reflection within the waveguide.

In some embodiments, the touch-sensitive surface is insensitive to touches at locations of the surface features.

In some embodiments, a height of the surface features from the touch sensitive surface is less than an evanescent field depth of the optical beams.

In some embodiments, the surface features are part of a waveguide and defined by a shape of the waveguide.

In some embodiments, the surface features are formed of material different than a material of the touch-sensitive surface.

In some embodiments, the surface features have an index of refraction less than an index of refraction of a material of the touch-sensitive surface.

In some embodiments, the surface features include at least one of: fluorine or silicone.

In some embodiments, a lateral spacing between surface features is not less than a size of a typical human finger ridge.

In some embodiments, the surface features include porous material or embedded microspheres.

In some embodiments, the touch-sensitive surface further comprises a fill material on the touch-sensitive surface and between at least some of the surface features.

In some embodiments, a portion of the surface features include a planar surface that is not parallel to the touch sensitive surface. In some embodiments, the portion of the surface features includes surface features that are at least one of triangular prisms, pyramids, or trapezoidal prisms.

In some embodiments, a portion of the surface features include a rounded surface. In some embodiments, the portion of the surface features include surface features that are at least one of hemispheres or bumps.

In some embodiments, the touch-sensitive device includes a barrier layer on the surface features and on portions of the touch-sensitive surface between the surface features. The barrier layer has an index of refraction less than an index of refraction of a material of the touch-sensitive surface. A thickness of the barrier layer is based on an evanescent field depth of the optical beams. In some embodiments, the thickness of the barrier layer is less than the evanescent field depth.

In some embodiments, the surface features are randomly arranged on the touch-sensitive surface.

In some embodiments, the surface features include surfaces configured to scatter incident light.

In some embodiments, the touch-sensitive device further comprises an anti-reflective layer on the surface features and on portions of the touch-sensitive surface between the surface features. In some embodiments, a thickness of the anti-reflective layer on the portions of the touch-sensitive surface between the surface features is less than an evanescent field depth of the optical beams.

In some embodiments, at least one of: a shape, a height, or a width of the surface features varies across the touch-sensitive surface.

Some embodiments relate to an optical touch-sensitive device that includes an optical waveguide, emitters and detectors, and a barrier layer. The optical waveguide has a touch-sensitive surface over which touch events are detectable. The emitters can produce optical beams that travel via total internal reflection through the waveguide to the detectors. Touches on the touch-sensitive surface disturb the optical beams. The touch-sensitive device determines touch events based on the disturbed optical beams. The barrier layer is above the touch-sensitive surface. The barrier layer has an index of refraction less than an index of refraction of the optical waveguide. A thickness of the barrier layer is less than an evanescent field depth of the optical beams. The emitters and detectors may be arranged along a periphery of the touch-sensitive surface. In some embodiments, optical beams are coupled by couplers to and from the touch-sensitive surface such that the emitters and detectors are not arranged along the periphery (e.g., the emitters are below the touch sensitive surface).

In some embodiments, a thickness of the barrier layer varies such that the portion of the barrier layer has a thickness less than the evanescent field depth and another portion has a thickness larger than the evanescent field depth.

In some embodiments, the optical touch-sensitive device further comprises surface features, on the touch-sensitive surface, that reduce touch object friction relative to an absence of surface features.

In some embodiments, the surface features are part of the barrier layer and defined by a shape of the barrier layer.

In some embodiments, the surface features are part of the waveguide and defined by a shape of the waveguide.

In some embodiments, a height of the surface features from the touch sensitive surface is less than an evanescent field depth of the optical beams.

In some embodiments, the surface features are formed of material different than a material of the touch-sensitive surface.

In some embodiments, the surface features have an index of refraction less than an index of refraction of a material of the touch-sensitive surface.

In some embodiments, a lateral spacing between surface features is not less than a size of a typical human finger ridge.

In some embodiments, the surface features include at least one of: fluorine or silicone.

In some embodiments, the barrier layer includes porous material or embedded microspheres.

In some embodiments, the surface features include porous material or embedded microspheres.

In some embodiments, a portion of the surface features include a planar surface that is not parallel to the touch sensitive surface. In some embodiments, the portion of the surface features includes surface features that are at least one of are triangular prisms, pyramids, or trapezoidal prisms.

In some embodiments, a portion of the surface features include a rounded surface. In some embodiments, the portion of the surface features include surface features that are at least one of hemispheres or rounded bumps.

In some embodiments, the surface features are randomly arranged on the touch-sensitive surface.

In some embodiments, at least one of: a shape, a height, or a width of the surface features varies across the touch-sensitive surface.

In some embodiments, the optical touch-sensitive device further comprises an anti-reflective layer on the barrier layer. In some embodiments, a combined thickness of the barrier layer and the anti-reflective layer is less than the evanescent field depth.

BRIEF DESCRIPTION OF DRAWINGS

Embodiments of the present invention will now be described, by way of example, with reference to the accompanying drawings, in which.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

A. Device Overview

Figure 1:
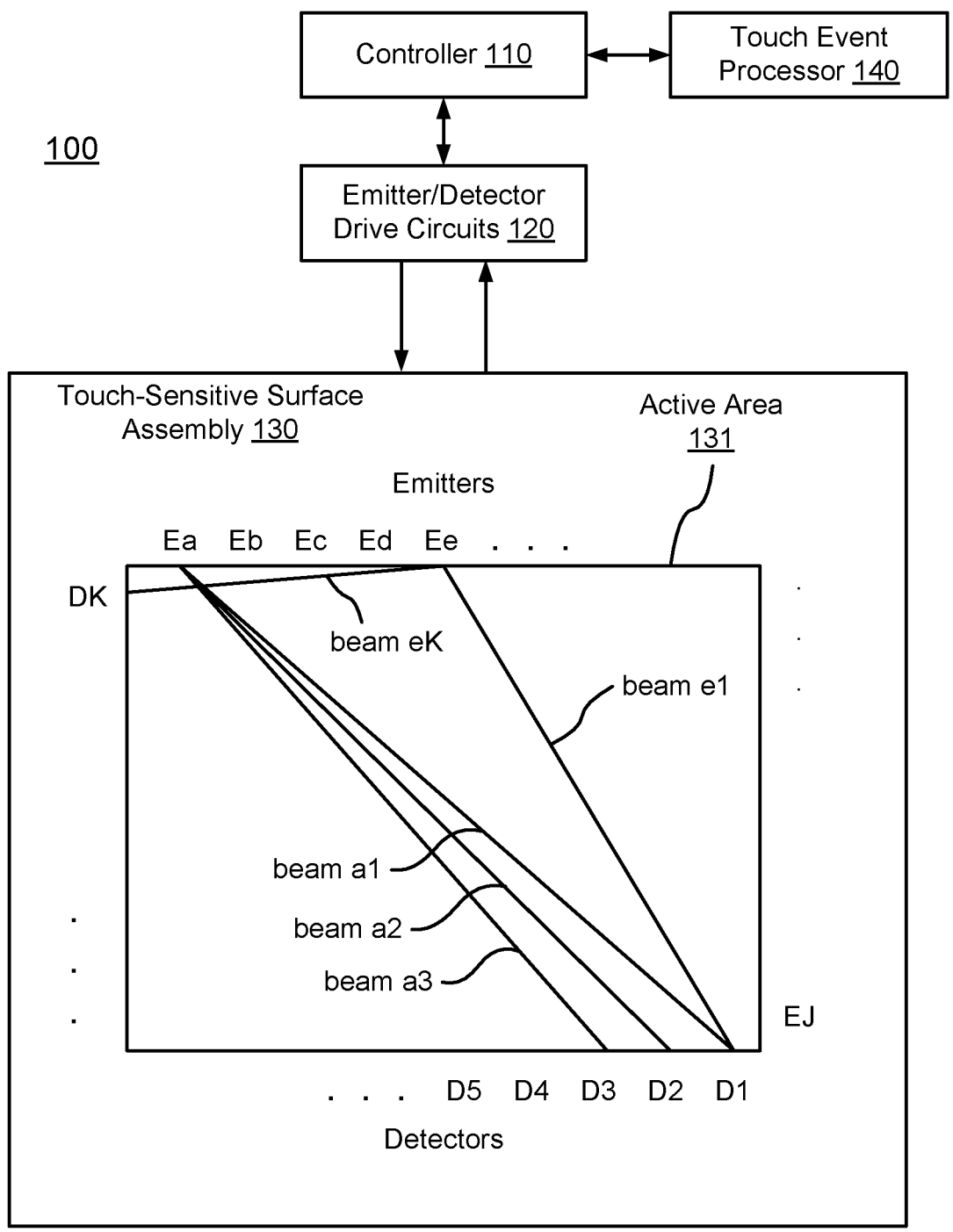
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area 131 may sometimes be referred to as the active touch area, touch-sensitive surface, or active touch surface, even though the surface itself may be an entirely passive structure such as an optical waveguide. The assembly 130 also includes emitters and detectors arranged along the periphery of the active touch area 131 (although emitters and detectors may only be arranged along a portion of the periphery or not along the periphery at all). In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes compared to conventional touch devices that cover an active touch area with sensors, such as resistive and capacitive sensors. Since the emitters and detectors are positioned around the periphery, increasing the screen size by a linear factor of N means that the periphery also scales by a factor of N compared to $N^2$ for conventional touch devices.

These touch-sensitive devices can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler zone phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

B. Process Overview

Figure 2:
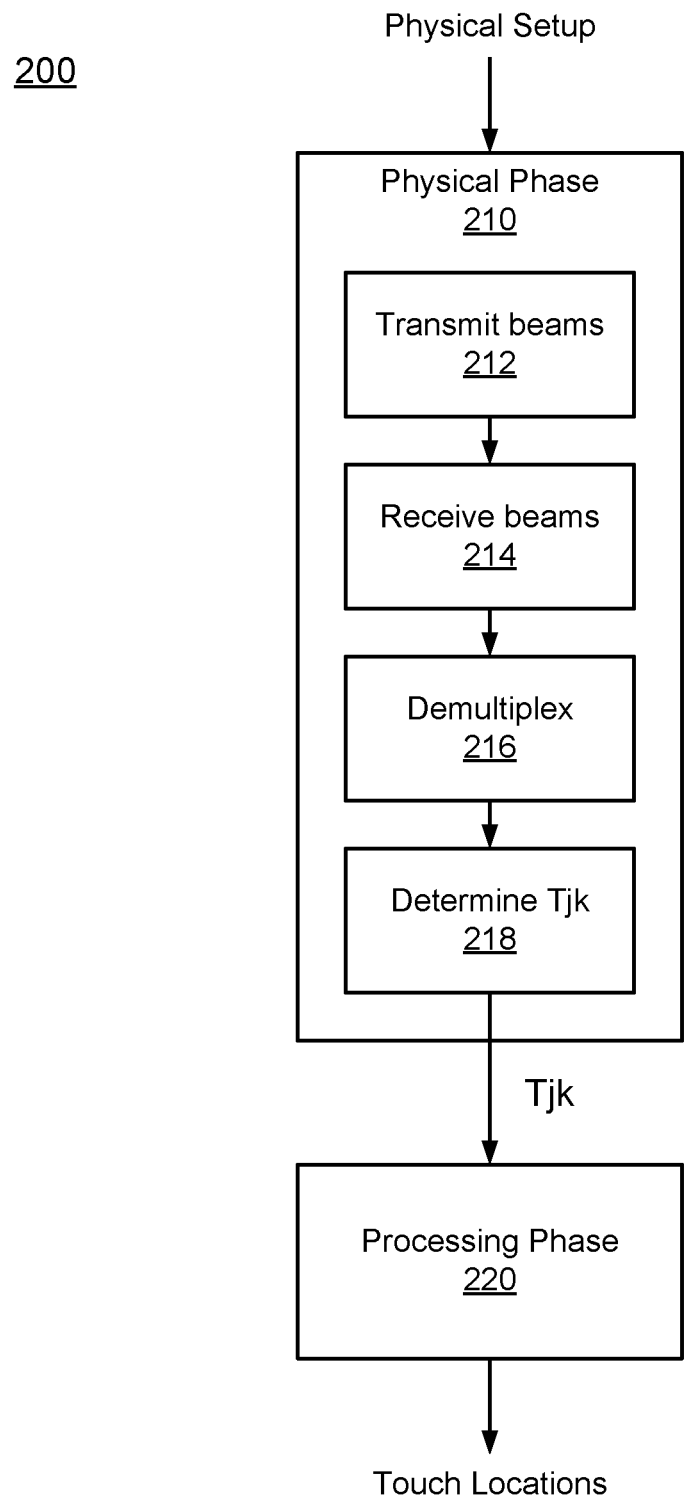
FIG. 2 is a flow diagram for determining the locations of touch events, according to one embodiment.

FIG. 2 is a flow diagram for determining the characteristics (e.g., locations) of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required. Also note that the Tjk may have a temporal aspect.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

B. Touch Interactions

Figure 3A:
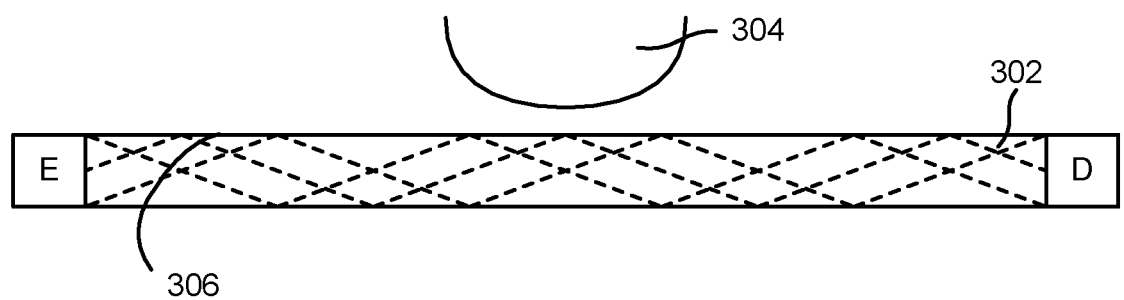
FIGS. 3A-3B illustrate a frustrated TIR mechanism for a touch interaction with an optical beam, according to some embodiments.
Figure 3B:
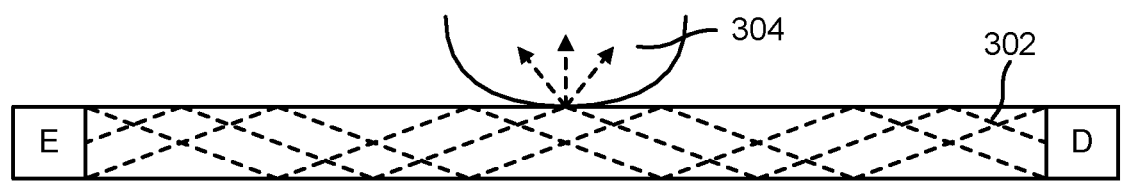

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam. In FIG. 3A, the optical beam, shown as a dashed line, travels from emitter E to detector D through an optically transparent planar waveguide 302. The beam is confined to the waveguide 302 by total internal reflection. The waveguide may be constructed of plastic or glass, for example. In FIG. 3B, an object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients $T_{jk}$ can be calculated.

Figure 3C:
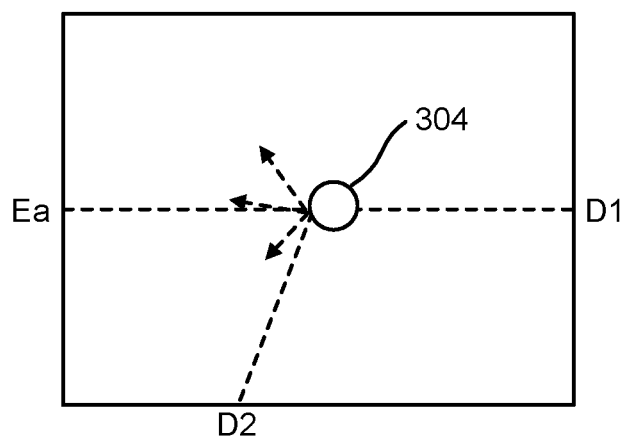
FIG. 3C illustrates a touch interaction with an optical beam enhancing transmission, according to one embodiment.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission. FIG. 3C is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light (UV). The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of the optical beams can be external or internal. Examples of sensor elements for the detector include charge coupled devices, photodiodes, photoresistors, phototransistors, and nonlinear all-optical detectors.

The emitters and detectors may also include optics and/or electronics in addition to the main optical source, sensor element. For example, emitters and detectors may incorporate or be attached to lenses to spread and/or collimate emitted or incident light. Additionally, one or more optical coupling assemblies (couplers) of varying design can be used to couple the emitters and detectors to the waveguide. The waveguide, coupler, and any intervening optical elements all have a similar refractive index that is higher than that of air to facilitate TIR throughout the entire optical path of each beam. These elements may be physically coupled together using a bonding agent that has a similar refractive index to the waveguide and coupler. Alternatively, at various points along the optical path air gaps may be present between elements in place of a bonding agent.

D. Optical Beam Paths

Figure 4A:
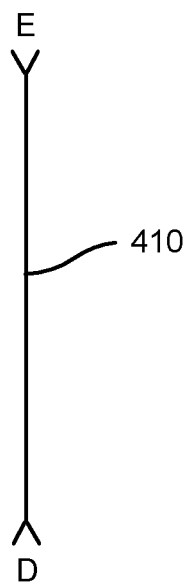
FIGS. 4A-4C are top views of differently shaped beam footprints, according to some embodiments.
Figure 4B:
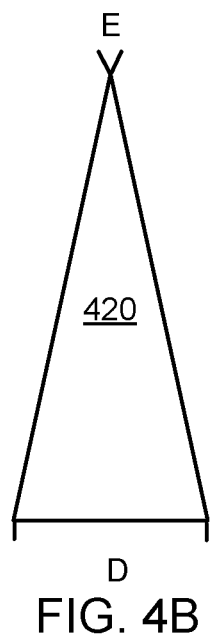
Figure 4C:
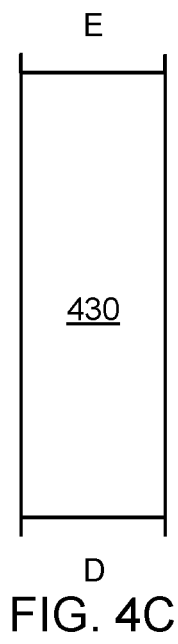

Another aspect of a touch-sensitive system is the shape and location of the optical beams and beam paths. In FIGS. 1-2, the optical beams are shown as lines. These lines should be interpreted as representative of the beams, but the beams themselves may be different shapes and footprints. FIGS. 4A-4C are top views of differently shaped beam footprints. In FIG. 4A, a point emitter and point detector produce a narrow "pencil" beam with a line-like footprint. In FIG. 4B, a point emitter and wide detector (or vice versa) produces a fan-shaped beam with a triangular footprint. In FIG. 4C, a wide emitter and wide detector produces a "rectangular" beam with a rectangular footprint of fairly constant width. Depending on the width of the footprint, the transmission coefficient $T_{jk}$ behaves as a binary or as an analog quantity. It is binary if the transmission coefficient transitions fairly abruptly from one extreme value to the other extreme value as a touch point passes through the beam. For example, if the beam is very narrow, it will either be fully blocked or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

The direction and spread of the light emitted from the emitters and received by the detectors may vary in spread or angle from beam footprints intended to cover the active area 131. To shape the beams to achieve the intended footprints, lenses may be attached to the emitters and detectors. For example, point emitters and detectors may be used in conjunction with lenses to spread beams in the horizontal or vertical directions.

Figure 5A:
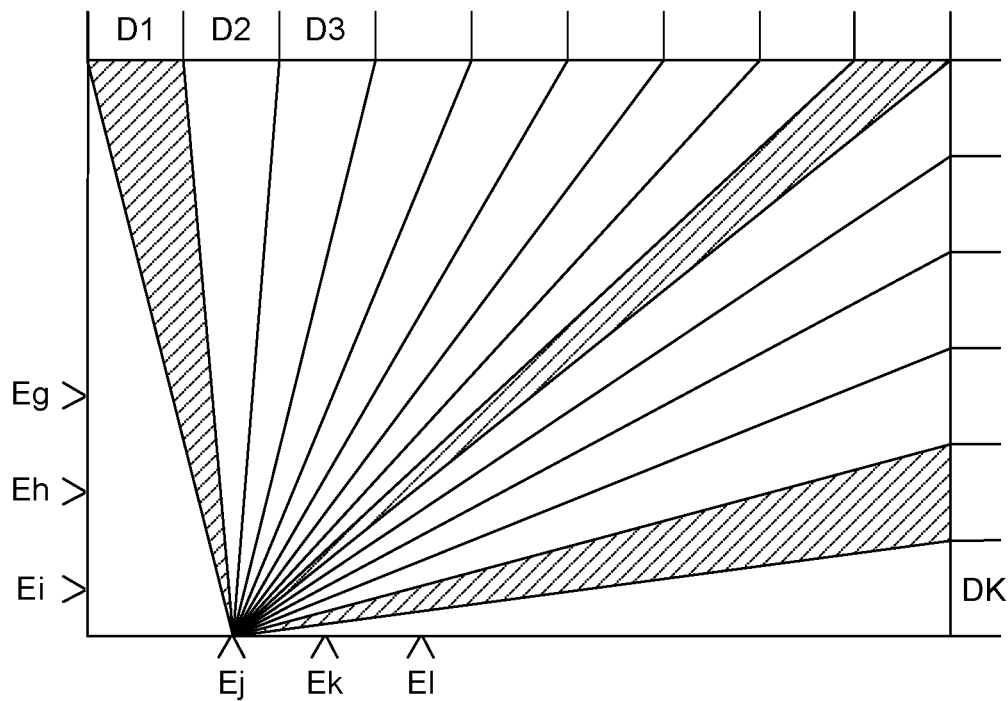
FIGS. 5A-5B are top views illustrating active area coverage by emitters and detectors, according to some embodiments.
Figure 5B:
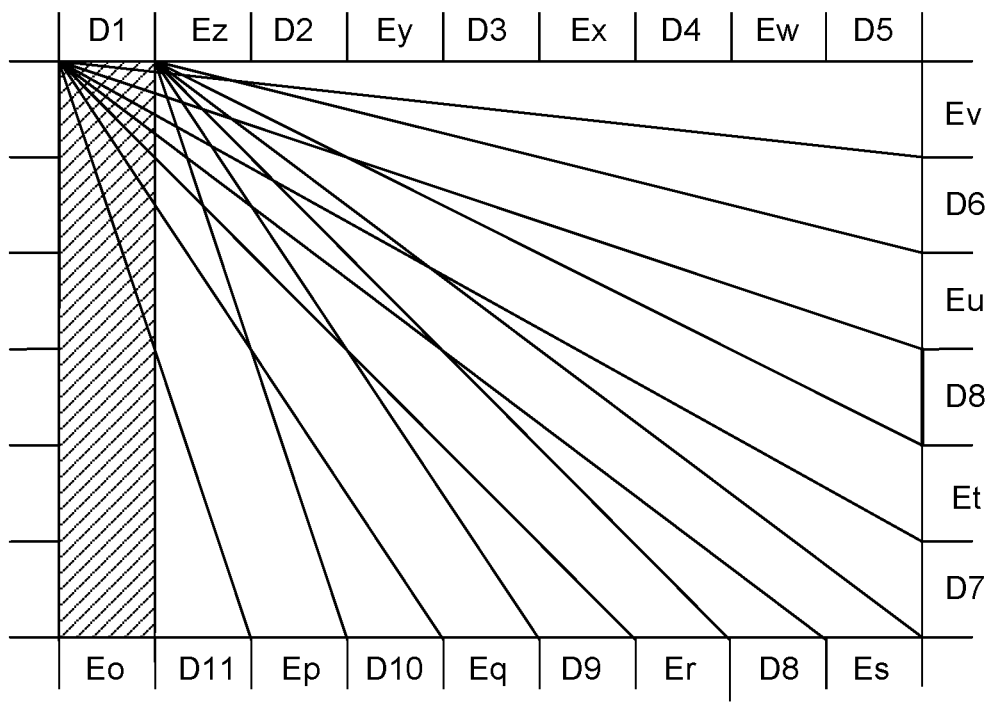

FIGS. 5A-5B are top views illustrating active area coverage by emitters and detectors. As above, the emitters and detectors are arranged along the periphery of the active area. All the emitters may be arranged on two sides of the active area, for example two adjacent perpendicular sides as illustrated in FIG. 5A. Similarly, all of detectors may be arranged on the other two sides of the active area. Alternatively, the emitters and detectors may be mixed or interleaved according to a pattern as illustrated in FIG. 5B. This pattern may be one emitter in between each detector, or another more complicated arrangement.

In most implementations, each emitter and each detector will support multiple beam paths, although there may not be a beam from each emitter to every detector. The aggregate of the footprints from all beams from one emitter (or to one detector) will be referred to as that emitter's (or detector's) coverage area. The coverage areas for all emitters (or detectors) can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The overall coverage area for all emitters should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

The concepts described above for emitters also apply to detectors. A detector's coverage area is the aggregate of all footprints for beams received by the detector.

E. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance $T_{jk}$ is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation. Examples of multiplexing include code division multiplexing, frequency division multiplexing, time division multiplexing. Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams. Several multiplexing techniques may also be used together.

III. Processing Phase

In the processing phase 220 of FIG. 2, the transmission coefficients $T_{jk}$ are used to determine the locations of touch points. Different approaches and techniques can be used, including candidate touch points, line imaging, location interpolation, touch event templates, multi-pass processing and beam weighting.

IV. Waveguide Structure

A. Tactile Surface Features

The active area of the optical touch-sensitive device 100 may include an optical waveguide structure. The waveguide structure may be rigid or flexible. The top surface (also referred to as a touch-sensitive surface) of the waveguide structure includes tactile surface features that modify the surface topography from being a continuous plane to small (e.g., sub-millimeter) regions of different heights. As further described below, these regions can be steps (also referred to as binary features or flat plateaus), rounded bumps, or any other suitable shape. Alternatively, the waveguide may have a complex undulating surface. For example, such a surface may have a random or pseudo random height profile. Users may directly feel the tactile surface features as their fingers move across the surface, or users may indirectly feel the tactile surface features (e.g., as a stylus moves across the surface). The surface features can enhance user interaction by reducing friction between a touch object (e.g., a finger or stylus) and the touch surface of the waveguide structure. The surface features can also give the user some feedback regarding the user's motion across the surface.

In some cases, specific features may mark specific locations on the surface, for example the edge or corners or center of the active area. The tactile feedback can then give users information about their position on the surface.

Human fingers typically cannot reliably detect surface features with heights less than approximately 10 nm. Conversely, surfaces with features having heights larger than 100 µm are generally perceived as very rough. Therefore, in various embodiments, the heights of tactical surface features range between 10 nm and 100 µm.

Figure 6A:
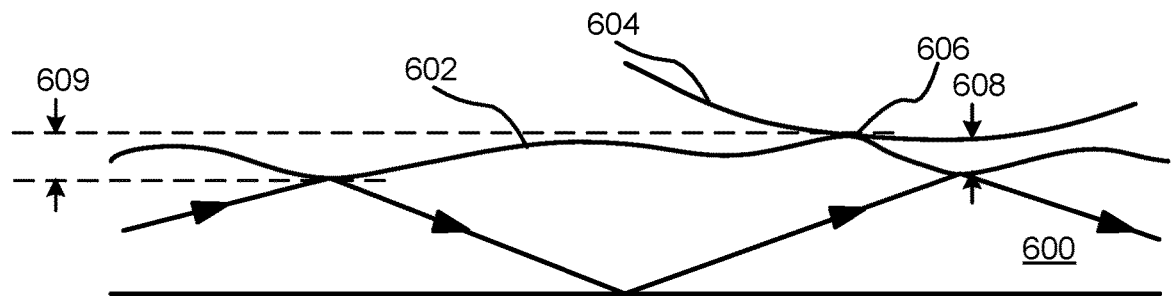
FIG. 6A is a cross sectional diagram showing undulations in the top surface of a waveguide structure, according to one embodiment.

FIGS. 6A-6D show examples of waveguide structures having different types of tactile surface features. FIG. 6A is a cross sectional diagram of a waveguide structure 600 with an undulating top surface 602. Because the undulations are not discontinuous, the top surface 602 has a continuously varying height. Local undulations may be characterized by various parameters, such as the local gradient, local curvature, and local angle of inclination (i.e., angle relative to the flat bottom surface). The undulating top surface may also be characterized by various parameters, including quantities based on the local parameters. Examples include the maximum, average and other statistical quantities (e.g., standard deviation). Thus, an undulating top surface may be characterized by the maximum gradient, or the average and standard deviations of the gradient. The difference 609 in height between the highest point and lowest point (maximum height variation) is another parameter characterizing the surface.

Conversely, certain constraints may be placed on these quantities when designing the top surface 602. Optical beams travel through the waveguide structure 600 using TIR. That is, optical beams which strike the top or bottom surface at greater than the critical angle, will reflect off that surface. If the top and bottom surfaces are parallel, an optical beam will experience TIR indefinitely (in theory). However, the undulations 602 result in a top surface that is not always parallel to the bottom surface.

This results in less efficient TIR compared to a waveguide where the top and bottom surfaces are parallel. First, particularly depending on the construction of the top surface 602, the top surface may cause more scattering. Second, the local inclination of the top surface may cause optical beams to strike at less than the critical angle, thus losing TIR, or to reflect at angles which later will lose TIR.

Third, undulations may reduce the amount of contact between an object 604 and the waveguide structure 600. Touch events on the top surface are detected by frustrated TIR. That is, the evanescent wave from TIR in the waveguide structure is disrupted by an contacting object. This frustrated TIR can occur even when the contacting object is slightly separated from the waveguide structure 600, but increasing the separation will reduce the effect. For example, as shown in FIG. 6A, when the finger 604 touches the local crest 606 of the top surface 602, this prevents the finger from contacting other neighboring points on the top surface 602. In this example, the maximum separation distance 608 is from the finger 604 to a local trough. This distance 608 preferably is small enough that the finger 604 is still within the evanescent field, so that the finger 604 will still disturb the optical beam propagating in the waveguide structure 600.

Figure 6B:
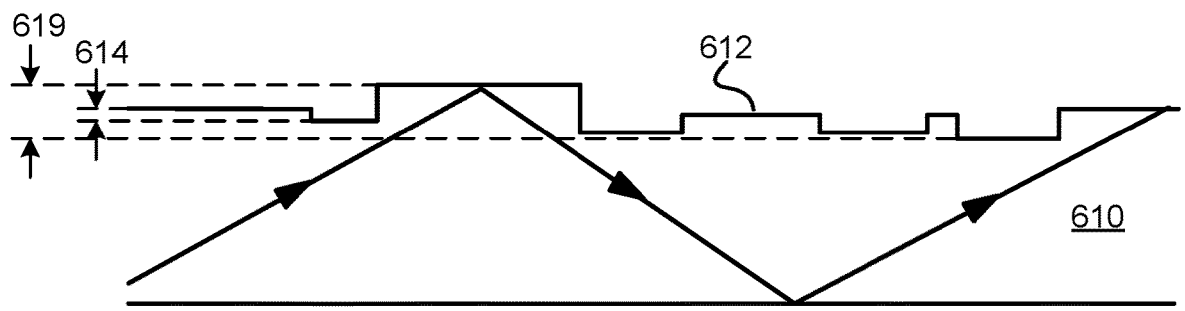
FIG. 6B is a cross sectional diagram showing stepped surface features in the top surface of a waveguide structure, according to one embodiment.
Figure 6C:
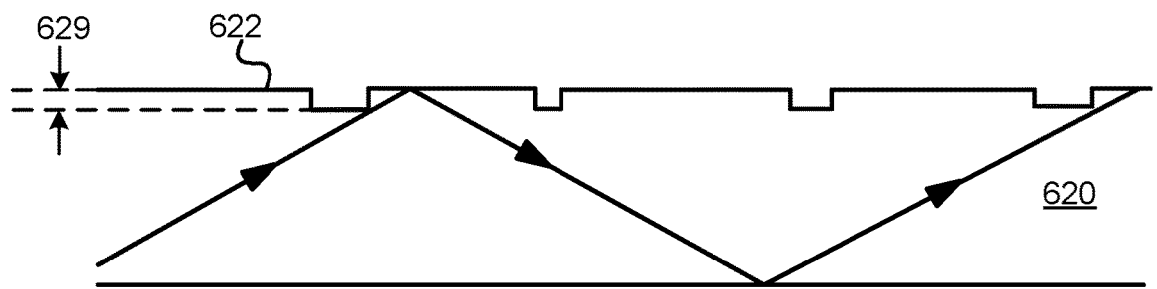
FIG. 6C is a cross sectional diagram showing binary surface features in the top surface of a waveguide structure, according to one embodiment.

FIG. 6B is a cross sectional diagram of a waveguide structure 610, where the top surface 612 has stepped surface features. The surface features are stepped because they have discretely varying step heights. In this example, the steps have many different heights and the heights could even have some element of randomness to their heights, although in other designs the steps may have two, three or another limited number of different heights. For this type of surface, quantities such as gradient and curvature are not as useful. Rather, useful parameters include step height (the difference in height between adjacent steps, such as 614) and maximum height variation 619. In FIG. 6C, the top surface 622 is a binary surface, meaning that it is constructed of steps of two different heights. For a binary surface, the step height and maximum height variation are the same 629.

Stepped surface features can also lead to less efficient TIR, but for different reasons. For example, there is no variation in slope for stepped surfaces. The top surface is always piecewise parallel to the bottom surface. However, the vertical walls between steps can cause vignetting or scattering but also direct loss by refracting light incident on vertical surface out of the waveguide and into the air. Sloped surfaces (as opposed to vertical surfaces) typically result a surface that is easier to clean because there are not steep-sided trenches to retain dirt, oil, etc.

Figure 6D:
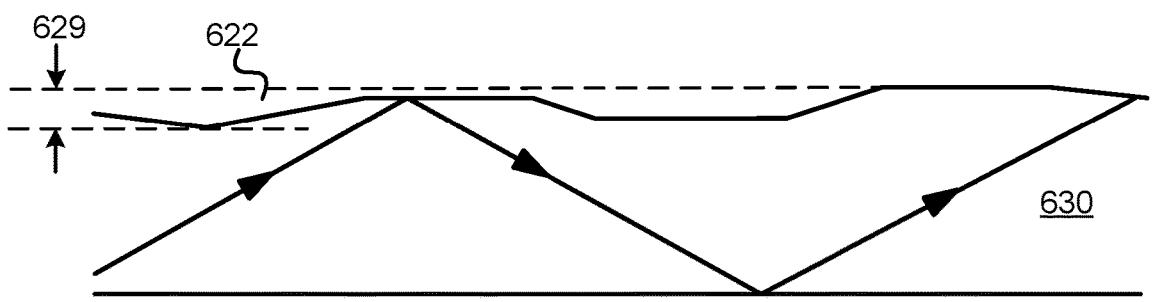
FIG. 6D is a cross sectional diagram showing piecewise flat features in the top surface of a waveguide structure, according to one embodiment.

FIG. 6D is a cross sectional diagram of a waveguide structure 630, where the top surface 622 is piecewise flat. Other variations will be apparent, for example top surfaces which have combinations of the continuously varying features, stepped features, and piecewise flat features of FIGS. 6A-D.

FIGS. 6A-D show different types of height variations (variations in the z axis) for tactile surface features. Tactile surface features can also have different lateral designs (in the x,y plane). FIGS. 7A-7F are top views illustrating different types of lateral designs for a binary surface. In these figures, the cross-hatched area represents one step height and the white area represents the other step height. The binary surface is used because it is easiest to illustrate, but these concepts can be extended to other types of surfaces.

In some embodiments, the tactile surface features are laterally spaced aperiodically on the top surface and may have some element of randomness to the spacing. In configurations where the touch-sensitive surface is part of a touch-sensitive display, periodic patterns may result in unwanted interference effects with light generated by a matrix of pixels of the display (which may be located below the waveguide and produce images or other display elements). For example, undesirable interference may result from interactions between the surface feature pattern and the light generated by the matrix of pixels. Aperiodic surface features may reduce such unfavorable interactions and also may provide anti-glare function by distributing reflected energy over a range of angles.

Figure 7A:
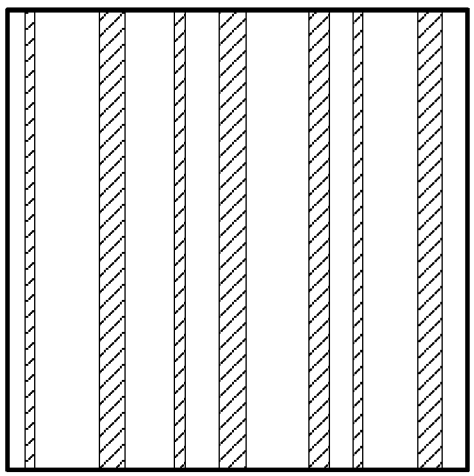
FIGS. 7A-7H are top views of different types of binary surface features, according to some embodiments.
Figure 7B:
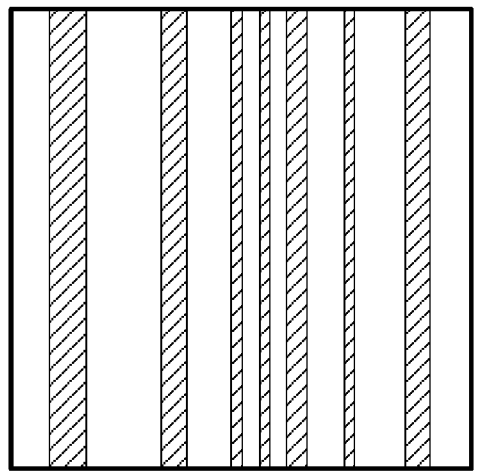

In FIGS. 7A and 7B, the lateral pattern has variations primarily in one direction. In FIG. 7A, relatively narrow stripes are placed to produce variations along a horizontal direction. Some randomness can be added by placing the stripes aperiodically, varying the widths and/or shapes of the stripes (or the intervening white areas) and/or tilting the stripes at slightly different angles. In FIG. 7B, the stripe pattern also contains some information about the location on the surface. The frequency of stripes is higher towards the center of the active area. In another variation, the duty cycle of stripes may vary as a function of location on the surface. There may be a higher percentage of area covered by cross-hatched stripes towards the center of the surface, and a lower percentage toward the edges. Different directions of variation are also possible. The variations may occur left to right on a touch-sensitive surface, or top to bottom on a touch-sensitive surface. Other directionality is also possible (e.g., bottom left to top right).

Figure 7C:
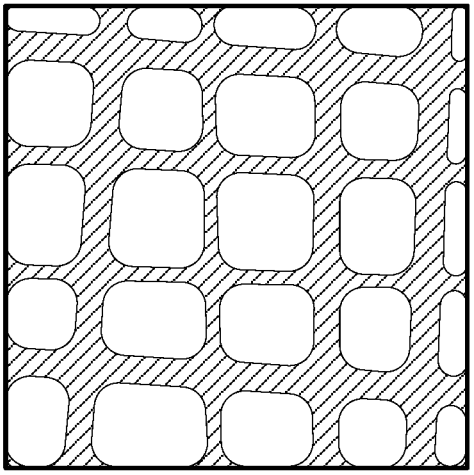
Figure 7D:
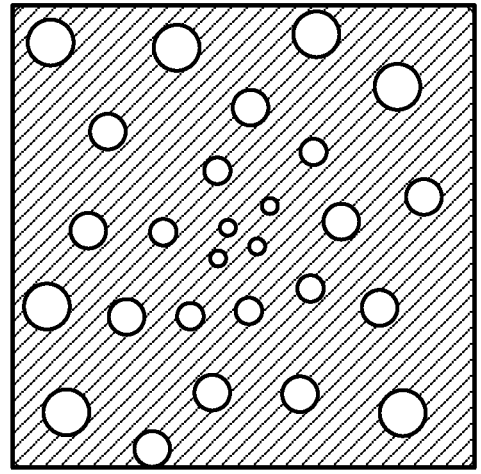
Figure 7E:
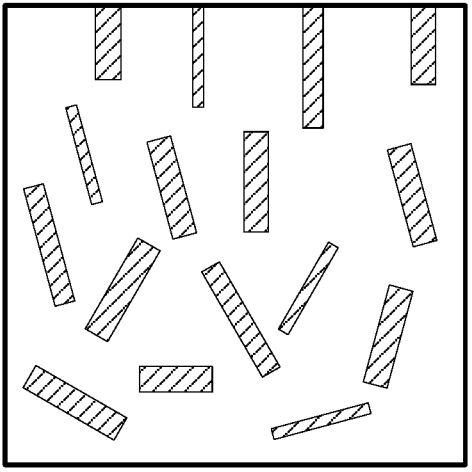
Figure 7F:
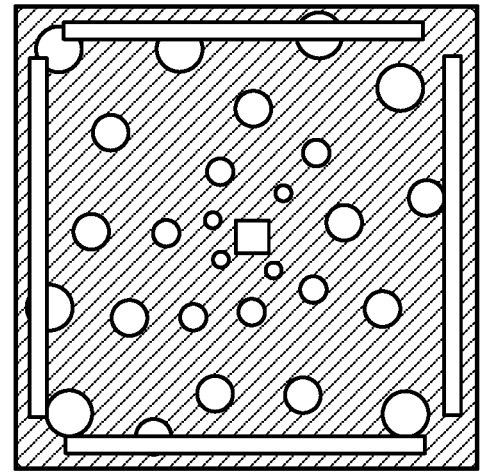

FIGS. 7C-7F show examples of two-dimensional patterns. FIG. 7C is roughly based on two crossed one-dimensional patterns. FIG. 7D is a scattering of circular islands. The islands are not located on a regular grid, but they are roughly increasing in size and spacing moving from the center of the active area to the edge. FIG. 7E is also a scattering of islands, but rectangular in shape and randomly varying in size and orientation. FIG. 7F is a combination of concepts. The basic pattern is similar to FIG. 7D, but there are long rectangles marking the edges and a center square island marking the center.

Figure 7G:
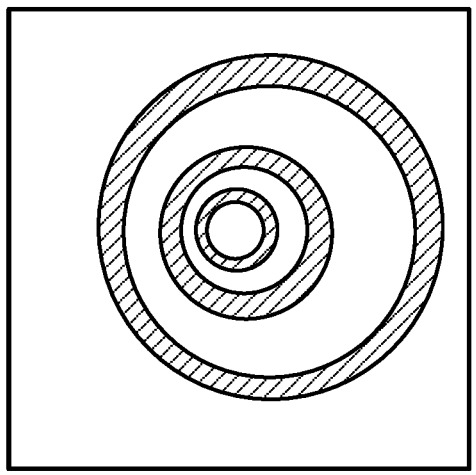
Figure 7H:
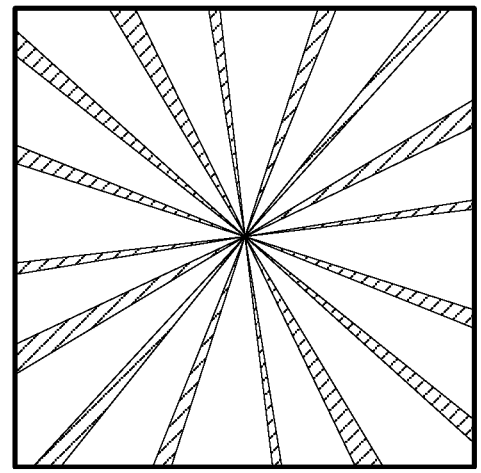

FIGS. 7G-7H show examples based on radial coordinates. In FIG. 7G, the surface features are roughly centered around a common center point. In FIG. 7H, the surface features roughly emanate radially from a common center point.

Patterns based on similar concepts can also be applied to non-binary surfaces. In some implementations, the manufacturing process can impart a directionality to the surface features. Examples of manufacturing processes include hot embossing (particularly for polymer waveguides), molding, nanolithography, machining, and etching (glass waveguides might be treated in this way). The lateral patterns can also be characterized by parameters: size (width, height, diameter), area, spacing, frequency of patterns, percent coverage, etc.

Variation in the top surface of the waveguide structure is usually unfavorable to TIR, as undulations or step changes in height of the top surface can create locations for light travelling in the waveguide via TIR to be incident at the top surface of the waveguide at an angle greater than the critical angle of the waveguide. To reduce the effect of the variation of the top surface of the waveguide, the variation in height of the top surface preferably is large enough to be tactilely detected by a human, but otherwise relatively small in height change. For example, if the top surface height undulates, the rate of change of surface angle is restricted to within a threshold rate of change. Alternately, if the top surface height changes in discrete steps, the step change in height is restricted to within a threshold step height. Both of these typically depend on overall optical budget. In some embodiments, the loss from a waveguide structure with tactile surface features preferably will not exceed ten times the loss from a flat waveguide (without tactile surface features), and more preferably will not exceed four times that loss.

The amount of light loss due to surface features is related to the height of the surface features (also referred to as the depth of surface modulation). An increase in the height of surface features generally results in a greater amount of light loss, all other things being equal. Thus, a set of surface features (e.g., binary surfaces) may be designed to be high enough to provide a desired tactile effect but low enough such that a sufficient amount of light is detected by the detectors (e.g., a touch event is discernable despite some light loss from the surface features).

The amount of light loss may be reduced when the height of the surface features is sufficiently small. Surface features with a height less than the wavelength of light propagating in the waveguide generally result in little or no light loss relative to a flat waveguide surface. For example, surface features with heights that are less than half of the wavelength of the light have no substantial impact on propagation through the waveguide. A high quality optical mirror may have a surface flatness of $\lambda/4$ (where $\lambda$ is the wavelength), so it is clear that surface height variations of this order are consistent with low reflection loss. Although there is no sharply defined boundary height above which the variations in surface height will strongly affect the reflected light levels, variations of $\lambda/2$ or less may generally be considered to not have a significant impact on specular reflection. Thus, in embodiments where light in the near infrared (IR) range (with a wavelength of ~1000 nm), the surface features may have heights between 10 nm and 500 nm without causing a significant degradation in the amount of light available for touch detection. Note that, as described previously, surface features with these heights are within the range that is perceptible by human fingers.

The amount of surface features on the surface also affect the amount of light leakage. Generally, increasing the number of surface features increases the total amount of light loss. Thus, the surface features may be designed to cover enough of the waveguide to provide a tactile sensation for the user yet be scarce enough to keep the amount of light leakage due the surface features within an acceptable range. For example, discrete surface features are printed on a waveguide such that the cumulative surface area covered by the features is less than 5% of the total surface area. The percentage of cumulative surface area covered by the surface features may vary by implementation and desired performance. Preferably, the contact area for a touch is not reduced to less than half what it would be with a flat waveguide (without tactile surface features). Note that if the space between surface features is large (hundreds of microns for example), the compliant nature of skin and many suitable pen materials may bring them into contact with much of the surface area between the surface features which is touch sensitive.

As previously mentioned, the shape of the surface features can also affect the amount of light leakage. Shapes with defined angled edges, such as triangles and squares may leak more light than shapes with soft edges or rounded surfaces, such as ramps and half circles. Since the angle that light strikes the top surface can affect TIR of the optical beams, surface features with edges parallel to the bottom surface of a waveguide may be chosen over features without edges parallel to the bottom surface in some implementations. Features with gently sloped surfaces may result in less light leakage than features with vertical surfaces. Thus, features with sloped edges that do not drastically change the elevation angles of light propagating in the waveguide may be preferred over edges in some implementations.

In one embodiment, the threshold rate of change of the undulations and/or the threshold step height is less than the distance by which the evanescent wave extends beyond the top surface, so that the contacting object still interact with the evanescent wave. This distance is typically on the order of a wavelength of light. For an undulating surface, the threshold rate of change of the top surface may be selected so that the difference in height between the peak and trough of any given undulation is within an order of magnitude of the wavelength of the light. For a stepped surface, the threshold step height may be selected to be within an order of magnitude of the wavelength of the light, and more preferably to be less than a wavelength or less than half the wavelength. Thus, as described previously, the features may have little or no impact on TIR of the propagating light as they are too small for the light to interact with. If the touch interaction has some compliance, then more height in the surface features can be accommodated since the features compress upon contact, reducing their effective height of the features.

With respect to lateral patterns, the spacing of the lateral patterning (e.g., the lateral distance between peaks of the undulations or the lateral distance between steps) may be larger than the wavelengths of light propagating in the waveguide by TIR. In various embodiments, a lateral spacing between tactile surface features is of the order of the size of a typical human finger. In some embodiments, a lateral spacing between tactile surface features is of the order of the size of a typical fingerprint ridge, which typically ranges from 200 µm to 850 µm. In some embodiments, the spacing between features is not less than the size of a typical human finger ridge. However, the spacing is also small enough to produce the desired tactile effect. For example, an average lateral size of the tactile surface features may be less than a size of a typical human finger but greater than a wavelength of the optical beams. If there is a display module underneath the waveguide structure (as in FIGS. 8 and 9), then the lateral size of the tactile surface features may also depend on the pixel size of the display module. For large display modules, the tactile surface features may be significantly smaller (e.g., 10% or less) than an area of a display pixel so that distortion of the displayed image is reduced. Typical pixel sizes range from approximately 50 µm to approximately 500 µm on a side.

FIGS. 10A-10F show additional examples of waveguide structures having different types of tactile surface features, according to some embodiments. The surface features can be protrusions 1002 or recesses 1022. The protrusions 1002 and recesses 1022 can be characterized by, among other properties, shape, height, width, and spacing. Although each of these characteristics are constant for each of the waveguides in FIGS. 10A-10F, the characteristics may vary across the surface of the waveguide. For example, the spacing between protrusions 1002 or recesses 1022 may vary as a function of distance from the edge of the waveguide. As other examples, the shape, height, or width of the surface features may vary across the surface of the waveguide. Alternatively, the protrusions 1002 or recesses 1022 may be randomly or pseudo-randomly spaced (e.g., surface features are designed as a surface on a roller which is imparted to a film (e.g., waveguide) passing over it).

Figure 10A:
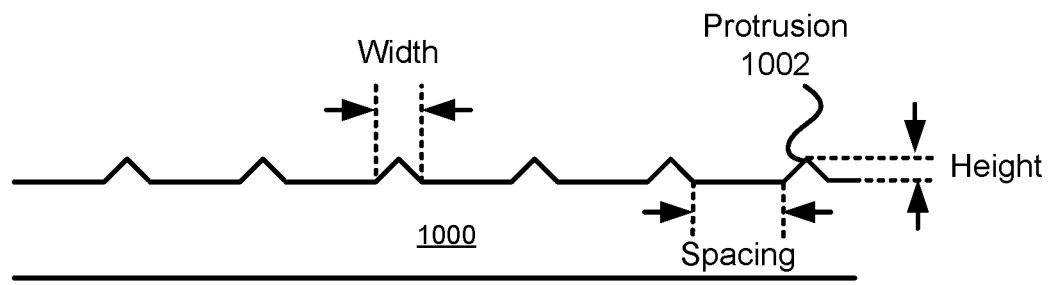
FIGS. 10A-10I are cross sectional diagrams showing surface features of waveguide structures, according to some embodiments.
Figure 10B:
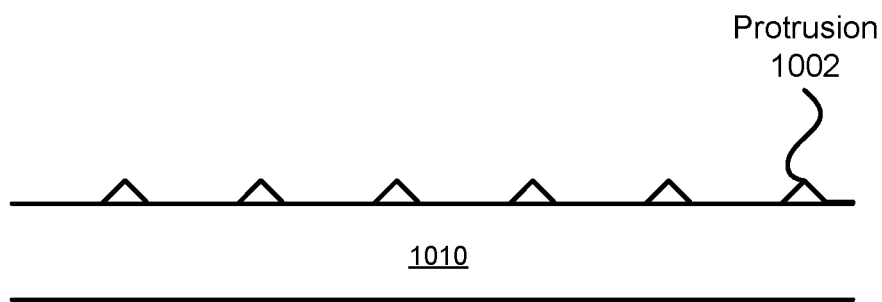

The surface features can be a part of the waveguide (e.g., as seen in FIG. 10A) or placed on top of the surface of the waveguide (e.g., as seen in FIG. 10B). For example, the protrusions 1002 may be printed on the surface of the waveguide. In another example, the surface features are part of a thin film placed on the surface of the waveguide. Producing a patterned surface can be achieved in many ways, such as embossing, hot embossing, UV nanolithography, photolithography, etching (e.g. reactive ion etching), and selective deposition methods such as inkjet printing and spraying.

Figure 10C:
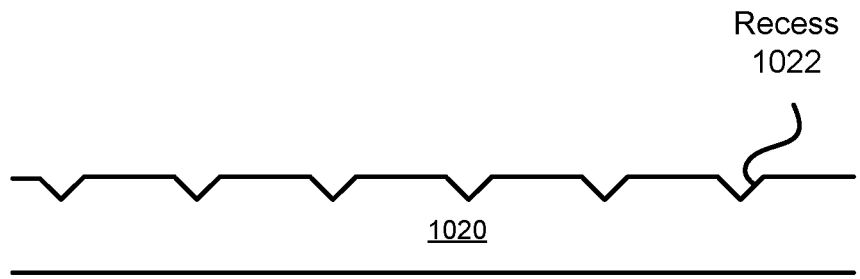

FIG. 10A is a cross sectional diagram of a waveguide structure 1000 with triangle protrusions 1002 (e.g., triangular prisms or pyramids in three dimensions). As previously discussed, shape of the protrusions 1002 can be different than those seen in FIG. 10A. For example, the protrusions 1002 can be rectangular (e.g., rectangular prism in three dimensions) or half-circles (e.g., hemispheres or rounded bumps in three dimensions). FIG. 10B is a cross sectional diagram of a waveguide structure 1010 with protrusions 1002 that have been added to the top surface of the waveguide (e.g., via printing). FIG. 10C is a cross sectional diagram of a waveguide structure 1020 with recesses 1022. FIG. 10I is a cross sectional diagram of a waveguide structure 1010 with half-circle protrusions 1002.

In some embodiments, the surface features are made of a low refractive index material. Thus, the sensing light propagating in the waveguide reflects (e.g., via TIR) off the boundary between the waveguide and the low refractive index material so that there is little or no light loss due to the surface features. A low refractive index material is one with a refractive index less than the waveguide, and generally significantly less than that of the waveguide. For example, the step down in refractive index is sufficient to support TIR at any of the intended elevation angles (with respect to the surface) of sensing light in the waveguide. For example, a UV curable liquid with a refractive index of 1.36 applied to a glass substrate with a refractive index of 1.50 can support TIR for elevation angles of up to 25 degrees (incidence angles above 65 degrees).

For example, typical waveguides are made of glass (n=1.5) or Poly(methyl methacrylate) (PMMA) (n=1.49). An example low refractive index material in this context is an aerogel (a porous material which is largely air), or a material (e.g., polymer) with embedded microspheres (e.g., see material 1042 in FIG. 10F) which are air-filled and much smaller than the wavelengths of light in the waveguide. In both of these examples, the effective refractive index is a blend of the refractive index of the solid material (e.g., n=1.41 or higher) and the refractive index of air (n=1.0003). Thus, the effective index of refraction of these materials can be significantly below the refractive index of the waveguide. Another example of low refractive index material includes solid materials with fluorine. These fluorine materials can have sufficiently low refractive indices to cause TIR at the boundary with the waveguide. For example polytetrafluoroethylene (PTFE) has a refractive index of 1.35. Other example low refractive index materials include silicones (e.g., n=1.4 to 1.46).

In one embodiment, a waveguide includes 10 μm high rounded bumps of low refractive index material which causes friction reduction by lifting the finger off of the waveguide surface for a short distance. The low refractive index of the material results in sensing light reflecting via TIR at the boundary with the waveguide so that little or no sensing light is lost due to the bumps. The bumps are, for example, formed by depositing the low refractive index material by inkjet printing (e.g., a low refractive index liquid which is subsequently cured by exposure to ultra-violet light).

Since light propagating in the waveguide reflects via TIR off the boundary between the waveguide and the low refractive index material, the waveguide may be insensitive to touch events at the locations of the surface features (e.g., if the surface features have a height of 2 μm or more). However, this is not problematic if the cumulative surface area of the features is small enough relative to the total surface area of the touch surface (e.g., if the spacing between features is significantly larger than the size of the features). Assuming this is the case, the device may still detect touch events at a desired resolution. For example, surface features with a square footprint with 20 μm sides that are spaced apart by 200 μm cover just 1% of the total area of the touch surface. The impact of the surface features on touch sensitivity may be further mitigated if the surface features have heights less than the evanescent field depth of the light propagating through the waveguide that senses touch events. In this case, the sensing light is still impacted by touches on the surface features because the touch object (e.g., a finger) disturbs the evanescent field, resulting in a loss of optical energy. Generally, features with a thickness of 2 μm or more render the waveguide insensitive to touches, while touches may be detected if features have a thickness less than 2 μm.

Figure 10D:
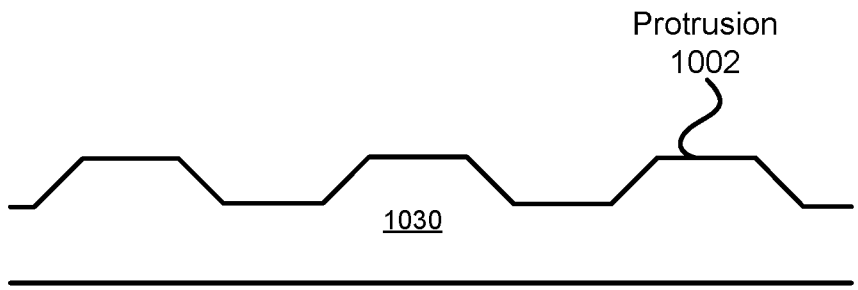

FIG. 10D is a cross sectional diagram of a waveguide structure 1030 with ramp protrusions 1002. As discussed above, since the ramp protrusions 1002 have sloped surfaces, they may reduce the amount of light leakage from the waveguide 1030 compared to shapes with sharper edges, such as squares. As an additional advantage, sloped surfaces can reduce the amount of oils and contaminants trapped on the surface compared to features with vertical surfaces. They may also make the surface easier to clean. In some embodiments, the ramp protrusions 1002 have a width of 45 μm and/or a height of 10 to 20 μm.

Figure 10E:
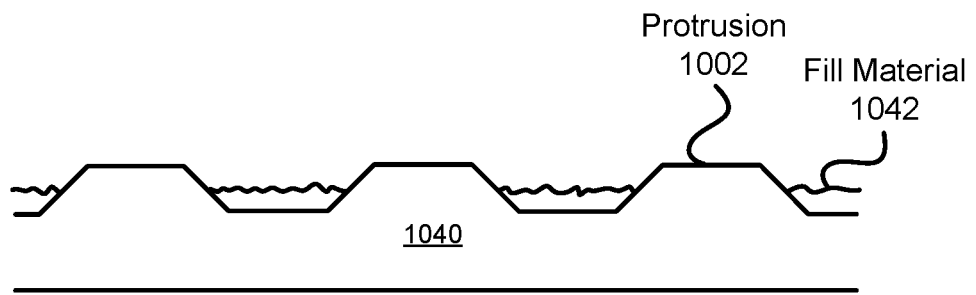
Figure 10F:
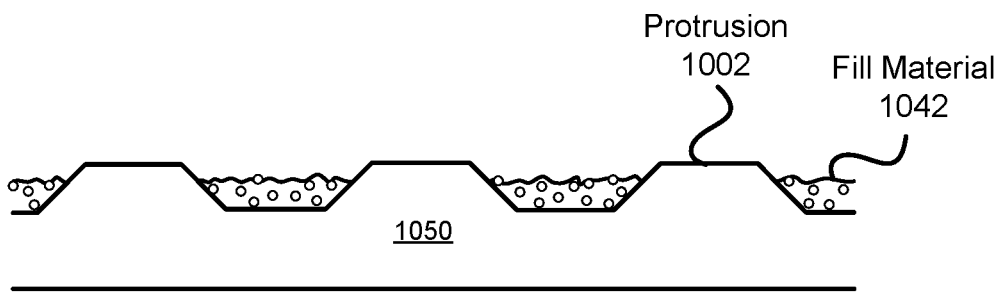

FIGS. 10E and 10F are cross sectional diagrams of a waveguide structure 1040 with fill material 1042 between protrusions 1002. The fill material 1042 can be placed between protrusions 1002 (or in recesses 1022) to create surfaces that reduce glare from the waveguide. For example, the fill material 1042 in FIG. 10F includes microspheres that may increase the surface roughness of the exposed surface of the fill material. The microspheres may be small voids in the fill material filled with gas (e.g., air) with radii of the order of (or smaller than) the wavelengths of visible light. Thus, the refractive index of the fill region as a whole may be somewhere between the refractive index of the fill material and the refractive index of the gas within the microspheres.

The fill material 1042 may be formed by the following example process. A curable liquid is applied to the profiled surface and then processed to make sure the liquid is absent from (or at least thinner on) the tops of the protrusions 1002 (for example by passing the structured surface under a roller on a roll-to-roll process). The liquid is then be exposed to a curing agent, such as UV light, to solidify the fill material 1042. Some shrinkage will usually occur during curing, and this is advantageous in making the protrusions 1002 stand above the cured fill material 1042. Afterwards, an optional roughing process may be applied, such as etching using an agent which is corrosive only to the cured fill material 1042 and not the substrate 1040 or 1050. Etching typically leaves a rough surface. If the fill material 1042 includes microspheres, etching can partially expose the microspheres which also increases the surface roughness. Processes that result in a rough surface on the fill material 1042 are advantageous because they make the surface a diffuse reflector of incident visible light while having no diffusing effect on the sensing light in the waveguide.

B. Multi-Part Waveguide Structure

In some implementations, the waveguide structure is constructed from multiple parts. In one approach, the waveguide structure includes a planar waveguide having a flat, featureless top surface (i.e., flat, parallel top and bottom surfaces), with a tactile coating on the top surface of the planar waveguide. The tactile coating can have a matching index of refraction to the planar waveguide. In some embodiments, the tactile coating is a tactile film (e.g., an optically transmissive film) having tactile surface features. The tactile coating may be manufactured using the above methods (or suitable alternative methods) and then affixed to the flat, featureless top surface of the waveguide structure. For example, an optically transmissive film may be applied as a solid layer to the planar waveguide. Alternately, it may be applied as a liquid which is then cured into a layer with the surface features. In some implementations, the tactile coating is applied as a separate layer around the periphery of the waveguide structure. The tactile coating may include printed material, e.g., a printed graphical border, a pigmented region, or a blocking layer.

Figure 8:
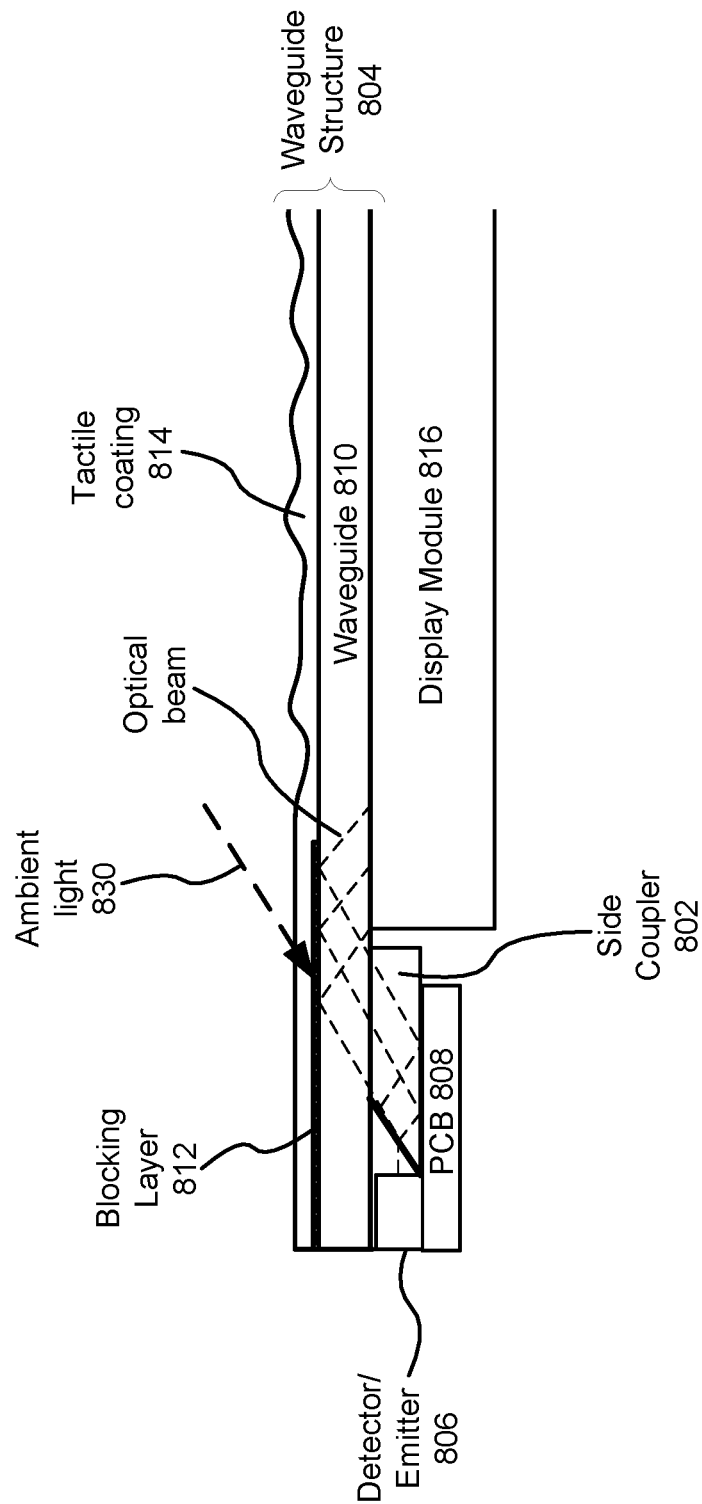
FIG. 8 is a side view of an optical touch-sensitive device having a side coupler, a waveguide structure with tactile surface features, and a blocking layer, according to an embodiment.

FIG. 8 is a side view of an optical touch-sensitive device 800 having a side coupler 802 and a waveguide structure 804 and blocking layer 812. The waveguide structure 804 includes a planar waveguide 810 having a flat, featureless top surface and also includes a tactile coating 814. In the example of FIG. 8, a blocking layer 812 is interposed between the top surface of the planar waveguide 810 and the underside of the tactile coating 814. In other embodiments, the blocking layer 812 may be located on top of the tactile coating 814, rather than underneath it. Alternately, there may be no tactile coating 814 in this area, with the blocking layer 812 located directly on top of the planar waveguide 810.

The waveguide structure 804 is optically coupled to the emitters and detectors 806 by an optical coupler assembly (or coupler) 802. The detectors and emitters 806 are oriented to receive and emit light, respectively, in a direction parallel to the top and bottom surfaces of the waveguide structure 804, such that light exits the emitters and enters the detectors in substantially the same lateral direction as the propagation direction within the waveguide structure 804. In FIG. 8, the coupler 802 is side coupled to the bottom surface of the waveguide structure 804. The optical touch-sensitive device 800 may also include a printed circuit board (PCB) 808 and a display module 816. In this example, both the waveguide 810 and the coating 814 extend past the active area of the touch-sensitive surface.

The blocking layer 812 blocks ambient light 830 from reaching the emitter/detectors 806. The transition from the tactile coating 814 over the active area to the material over the blocking layer 812 is preferably level, so that no tactile boundary can be felt. The coating 814 over the blocking layer 812 may be smooth, rather than intentionally tactile. In one implementation, the blocking layer 812 is opaque to both visible light as well as the IR optical beams. For example, the blocking layer 812 may be a reflective layer to reflect away the ambient light 830. Alternately, the blocking layer 812 may be an absorbing layer that absorbs the external light. The tactile coating 814 allows the blocking layer 812 to be moved to the top surface of the waveguide 810 without introducing a tactile edge due to the blocking layer. This, in turn, allows for greater design freedom in the detectors, emitters and couplers.

Figure 9:
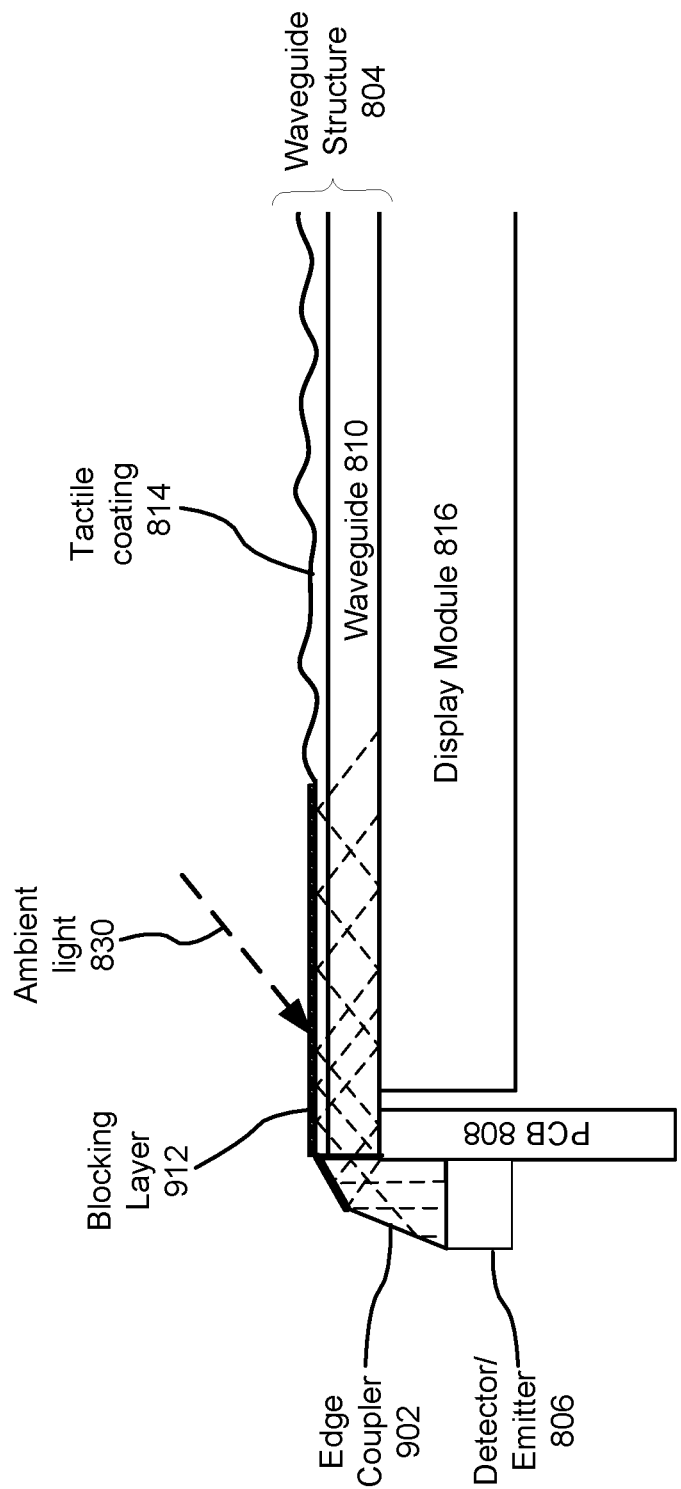
FIG. 9 is a side view of an optical touch-sensitive device having an edge coupler, a waveguide structure with tactile surface features, and a blocking layer, according to an embodiment.

FIG. 9 is a side view of an optical touch-sensitive device having an edge coupler 902 and a waveguide structure 804 and blocking layer 912. Compared with FIG. 8, the detectors and emitters 806 are oriented to receive and emit light, respectively, in a direction perpendicular to the top and bottom surfaces of the waveguide 810, such that light exits the emitter in a direction rotated by ninety degrees with respect to the propagation direction in the waveguide structure 804. The coupler 902 is edge coupled to a side edge surface of the waveguide structure 804. In this example, the blocking layer 912 is located on top of the coating 814, rather than between the coating 814 and waveguide 810 as shown in FIG. 8.

C. Anti-Glare Surface Features

As previously described, tactile surface features can improve the user interaction experience by reducing friction and providing tactile feedback. Tactile surface features can also reduce glare of the touch-sensitive surface by diffusing or scattering light. Said differently, the surface features can disturb the spectral reflection of light on the surface.

To reduce glare, the surface features may have dimensions (e.g., height, width, length, surface area, size, etc.) on the order of wavelengths of visible light incident on the surface. Specifically, since visible light wavelengths range from approximately 400 nm to 700 nm, dimensions of surface features may be tens, hundreds, or thousands of nm long. For example, glare reducing surface features have a height modulation of 300 nm to 200 µm. In some embodiments, the wavelengths of sensing light are longer than visible light (e.g., near infrared). Thus, surface features with sizes of the order of visible wavelength may advantageously disturb specular reflections of visible light while remaining essentially specular at the longer sensing wavelengths.

The surface features may have a variety of surface angles to scatter incident light in different directions. For example, referring to FIG. 10B, the slopes of the triangles may be different for each protrusion 1002 (or set of protrusions 1002). If the exact geometry of FIG. 10B were used, the result would be three essentially specular reflections (one from the top surface of the waveguide and one corresponding to each side of the triangular surface features). Rounded bumps also inherently provide a variety of surface angles that can scatter light in different directions. The waveguide may include more than one shape of surface feature (e.g., triangles, bumps, and ramps). To further reduce glare, the surface features may be arranged in a random (or pseudo-random) order on the waveguide. For example, an etching process may form a rough surface with random features that scatter light in various directions.

D. Anti-Reflective Layer

A waveguide may have an anti-reflective layer to suppress light reflection. While anti-glare features diffuse light incident on the surface, anti-reflective layers reduce or eliminate the amount of light reflected from the surface via interference effects. Anti-reflective layers typically include low index of refraction material (material with an index of refraction less than the waveguide). Anti-reflective layers may reduce the touch sensitivity of the waveguide because a touch object is not in direct contact with the waveguide, reducing its impact on TIR. To account for this, the thickness of the anti-reflective layer may be chosen that is less than the evanescent field depth such that touch events still reduce the amount of optical energy reflected within the waveguide. Additionally or alternatively, the anti-reflective layer may vary in thickness (including being entirely absent in some areas) such that regions of the touch surface are less affected by the anti-reflective layer than other regions. Tactile surface features may be made partially or entirely of anti-reflective materials.

In some embodiments, an anti-reflective layer includes one or more layers that reduce the amount of change in the index of refraction at layer interfaces. For example, to reduce the index of refraction change between air (n=1.003) and a waveguide (e.g., n=1.5) a material with n=1.3 is arranged on the waveguide. This reduces the total amount of reflected light and may be referred to as index-matching. Preferably, the index of refraction of a given layer is the square root of the index of refraction of the material below the given layer. For example, if the waveguide has n=1.5, the anti-reflective layer has an index of refraction of $\sqrt{n}$=1.225. Adding materials on the waveguide may increase the TIR critical angle of the waveguide surface. Thus, the range of angles at which sensing light propagates via TIR in the waveguide is reduced. Consequently, such approaches involve a tradeoff between reducing reflection from the exterior of the waveguide and flexibility with regard to the angles used for the sensing light within the waveguide.

Figure 10G:
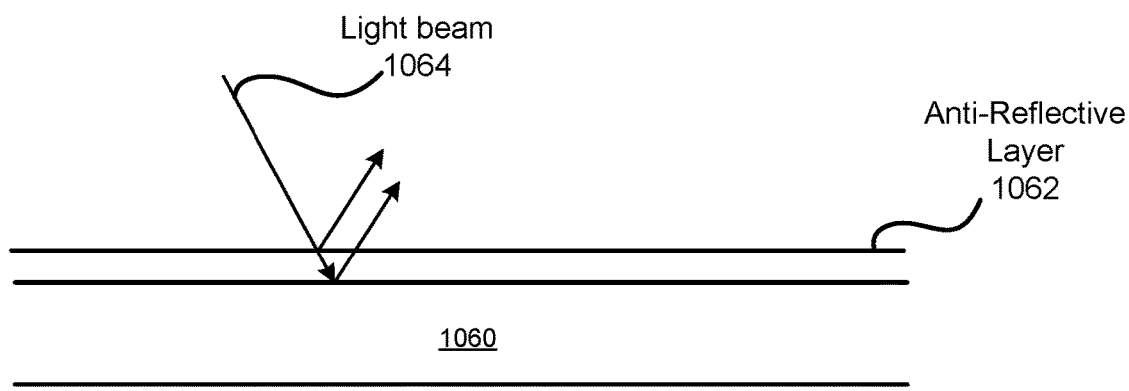
Figure 10H:
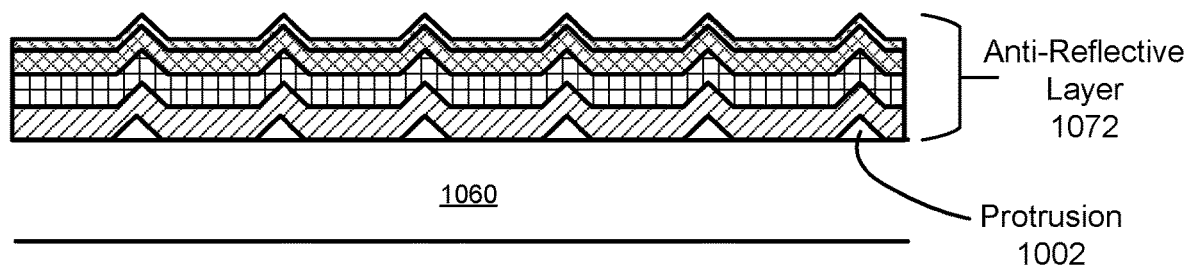
Figure 10I:
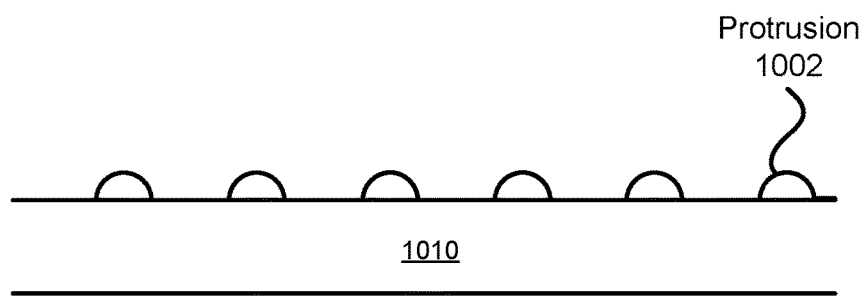

In other embodiments, an anti-reflective layer is an interference coating that reduces reflections by forming reflected light beams that are out of phase with each other. FIGS. 10G and 10H are cross sectional diagrams of waveguides structures 1060 with anti-reflective layers, according to some embodiments. FIG. 10G illustrates a light beam 1064 that reflects at the surface of the anti-reflective layer 1062 and the surface of the waveguide 1060. Due to the thickness of the anti-reflective layer 1062, the reflected beams are out of phase by half a wavelength and therefore destructively interfere. Since visible light has a range of wavelengths (~400-700 nm), an anti-reflective layer may have many layers of differing refractive index and thicknesses to cause destructive interference for multiple visible wavelengths (e.g., see FIG. 10H).

While tactile surface features, anti-glare surface features, and anti-reflective layers were described in separate sections, waveguides may include any combination of these components. In embodiments with an anti-reflective layer, the anti-reflective layer is generally the outermost layer. As illustrated in FIG. 10H, a waveguide 1060 can include protrusions 1002 (tactile surface features) and an anti-reflective layer 1072. Note that while the protrusions 1002 are covered by the anti-reflective layer 1072 in FIG. 10H, the features are still present enough on the top surface to reduce tactile friction. Furthermore, while embodiments herein are described in the context of detecting touch events on a waveguide, a waveguide is not necessary. For example, sensing light can travel over a touch surface (e.g., with surface features) to detect touch objects in contact (or near) the touch surface with the touch-surface structure providing one or more of tactile effects, anti-glare behavior, or anti-reflection behavior.

E. Applications for Thin Waveguides

As previously described, tactile surface features, anti-glare surface features, and anti-reflective layers may reduce the touch sensitivity of the waveguide, meaning the amount by which the optical energy of sensing light is attenuated by a touch object is less than it would be for a plain waveguide surface. In some cases, reducing the touch sensitivity may be advantageous, in particular with for thin waveguides.

In some embodiments, it may be desirable to decrease the thickness of the waveguide (e.g., reductions in cost, size, and weight). However, as the thickness of a waveguide decreases, the waveguide can become more vulnerable to surface contamination (even for normal and expected amounts of surface contamination). Other factors held constant, as the thickness of a waveguide decreases, the number of internal reflections of the sensing light in the waveguide will increase. Specifically, a light beam will reflect off of the top surface every 2T/tan θ meters where T is the waveguide thickness and θ is the elevation angle of the sensing light relative to the surface of the waveguide. For example, if the elevation angle is 16° and the waveguide is 3.2 mm thick, the sensing light encounters the top surface every 22.32 mm (44.8 reflections if the waveguide is 1 m wide). However, if the waveguide is 0.4 mm thick, the sensing light encounters the top surface every 2.79 mm (358 reflections if the waveguide is 1 m wide). Since transmission through the waveguide is the compound transmission of every reflection, a large number of reflections can result in low optical transmission if there is even a small loss at each reflection. A small loss can occur over large areas of the waveguide surface when a contaminant such as oil is deposited on the surface. For example, with a 1% loss at each reflection (e.g., caused by contamination), the overall transmission is 0.99^44.8=63.7% for the 3.2 mm waveguide but only 0.99^358=2.7% for the 0.4 mm waveguide. Thus, thinner waveguides are particularly vulnerable to contamination.

Figure 11:
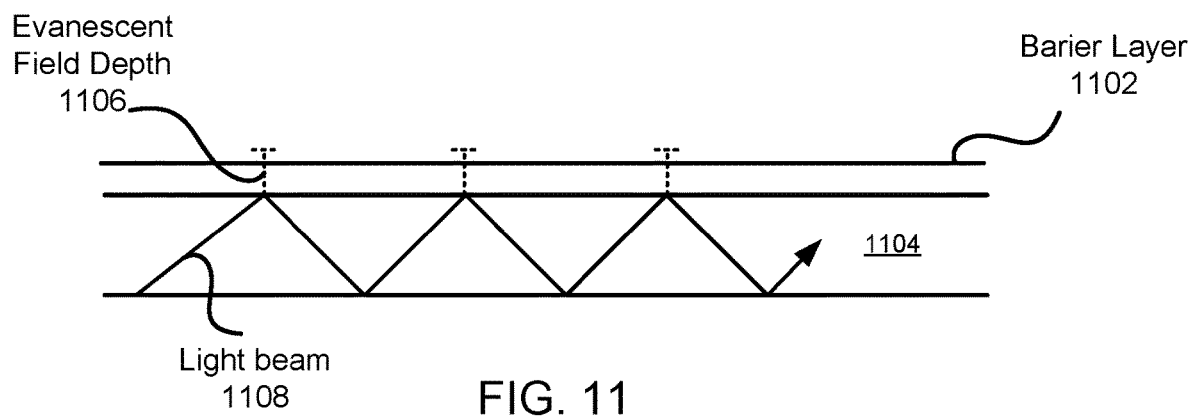
FIG. 11 is a cross sectional diagram showing a barrier layer on a waveguide, according to an embodiment.

A low refractive index barrier layer (e.g., a layer including tactile surface features) may address this problem, reducing the impact of contamination losses for thin waveguides. FIG. 11 illustrates a cross section of a waveguide 1104 with a barrier layer 1102. A sensing light beam 1108 propagates via TIR through the waveguide. As illustrated, the barrier layer 1102 is thinner than the evanescent field depth 1106 (also referred to as the evanescent field height). The barrier layer may have a thickness related to the evanescent field depth and selected such that a desired proportion of the sensing light is available for touch detection for any given reflection event. For example, if the barrier layer is slightly thinner than the evanescent field depth, then only that portion of the evanescent field (e.g., 10% of the total optical energy) will be impacted by an object touching the waveguide. Similarly, only that proportion of the optical energy may be lost by a phantom touch caused by surface contamination. The thickness of the barrier layer may be continuous over the entire touch surface or patterned to vary in thickness (e.g., for additional anti-glare or tactile effects). Patterning in this way provides another way of controlling the final sensitivity of the waveguide.

To give a particular example, light propagating at an elevation angle of 30 degrees in an example waveguide of 5 mm thickness reflects off the touch surface 100 times over a span of 1.73 meters. If the entire waveguide touch surface was covered with some contaminating material (e.g., finger oils), each reflection would result in a loss of optical energy. Even assuming this loss is 1%, this is still significant because it is compounded by the number of reflections over the waveguide span. In fact, with 100 reflections this corresponds to only 36.6% of the optical energy traversing the entire 1.73 meter span. While this is reasonable for a functioning touch sensor, if the waveguide thickness is instead just 0.5 mm, the number of reflections increases to 1,000 for the same 1.73 m span. In this case, just 0.0043% of the light traverses the entire span, severely impairing the functionality of the touch sensor.

However, adding a barrier layer to the touch surface of the 0.5 mm thick waveguide such that only 10% of the evanescent energy is available at the touch surface may reduce the loss to contamination for each reflection. For example, if the loss is reduced from 1% to 0.1%, 36.8% of the light traverses the entire span of the 0.5 mm waveguide, which is similar to the result obtained for a 5 mm waveguide (without a barrier layer). In other words, the reduction in sensitivity caused by the barrier layer reduces the losses due to contamination, making the touch devices less sensitive to contamination of the touch surface, which in turn enables the use of thinner waveguides. Additionally or alternatively, the number of touch insensitive tactile surface features on the surface may be increased to reduce the touch sensitivity of the waveguide and similarly reduce the impact of surface contaminants. The surface features may be formed below or above the barrier layer. In some embodiments, the surface features are made of the same material as the barrier layer.

V. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An optical touch-sensitive device comprising:
   a touch-sensitive surface over which touch events are detectable;
   surface features, on the touch-sensitive surface, configured to reduce touch object friction relative to an absence of surface features;
   emitters and detectors, the emitters configured to produce optical beams that travel across the touch-sensitive surface to the detectors, wherein touches on the touch-sensitive surface disturb the optical beams, the touch-sensitive device determining touch events based on the disturbed optical beams.

2. The optical touch-sensitive device of claim 1, wherein the touch-sensitive surface is a top surface of a planar optical waveguide, wherein the optical beams travel across the touch sensitive surface via total internal reflection within the waveguide.

3. The optical touch-sensitive device of claim 2, wherein the surface features are part of the waveguide and defined by a shape of the waveguide.

4. The optical touch-sensitive device of claim 1, wherein a height of the surface features from the touch sensitive surface is less than an evanescent field depth of the optical beams.

5. The optical touch-sensitive device of claim 1, wherein the surface features are formed of material different than a material of the touch-sensitive surface.

6. The optical touch-sensitive device of claim 1, wherein the surface features have an index of refraction less than an index of refraction of a material of the touch-sensitive surface.

7. The optical touch-sensitive device of claim 1, wherein a lateral spacing between surface features is not less than a size of a typical human finger ridge.

8. The optical touch-sensitive device of claim 1, wherein the touch-sensitive surface further comprises a fill material on the touch-sensitive surface and between at least some of the surface features.

9. The optical touch-sensitive device of claim 1, wherein a portion of the surface features include a planar surface that is not parallel to the touch sensitive surface.

10. The optical touch-sensitive device of claim 9, wherein the portion of the surface features includes surface features that are at least one of triangular prisms, pyramids, or trapezoidal prisms.

11. The optical touch-sensitive device of claim 1, wherein a portion of the surface features include a rounded surface.

12. The optical touch-sensitive device of claim 11, wherein the portion of the surface features include surface features that are at least one of hemispheres or rounded bumps.

13. The optical touch-sensitive device of claim 1, further comprising:
   a barrier layer on the surface features and on portions of the touch-sensitive surface between the surface features, wherein the barrier layer has an index of refraction less than an index of refraction of a material of the touch-sensitive surface and wherein a thickness of the barrier layer is based on an evanescent field depth of the optical beams.

14. The optical touch-sensitive device of claim 13, wherein the thickness of the barrier layer is less than the evanescent field depth.

15. The optical touch-sensitive device of claim 1, wherein the surface features are randomly arranged on the touch-sensitive surface.

16. The optical touch-sensitive device of claim 1, wherein the surface features include surfaces configured to scatter incident light at multiple angles.

17. The optical touch-sensitive device of claim 1, wherein the touch-sensitive device further comprises an anti-reflective layer on the surface features and on portions of the touch-sensitive surface between the surface features.

18. The optical touch-sensitive device of claim 17, wherein a thickness of the anti-reflective layer on the portions of the touch-sensitive surface between the surface features is less than an evanescent field depth of the optical beams.

19. The optical touch-sensitive device of claim 1, wherein at least one of: a shape, a height, or a width of the surface features varies across the touch-sensitive surface.

20. An optical touch-sensitive device comprising:
   an optical waveguide with a touch-sensitive surface over which touch events are detectable;
   emitters and detectors, the emitters configured to produce optical beams that travel via total internal reflection through the waveguide to the detectors, wherein touches on the touch-sensitive surface disturb the optical beams, the touch-sensitive device determining touch events based on the disturbed optical beams; and
   a barrier layer above the touch-sensitive surface, wherein the barrier layer has an index of refraction less than an index of refraction of the optical waveguide and wherein a thickness of the barrier layer is less than an evanescent field depth of the optical beams.

* * * * *